United States Patent [19]

Okamoto et al.

[11] Patent Number: 4,982,241
[45] Date of Patent: Jan. 1, 1991

[54] AUTOMATIC ORIGINAL DOCUMENT FEEDER

[75] Inventors: Yuji Okamoto; Masato Tamehira; Yasuji Yamauchi, all of Nara, Japan

[73] Assignee: Sharp Kabushiki Kaisha, Osaka, Japan

[21] Appl. No.: 206,302

[22] Filed: Jun. 14, 1988

[30] Foreign Application Priority Data

Jun. 15, 1987 [JP] Japan .................................. 62-149396
Jun. 15, 1987 [JP] Japan .................................. 62-149397
Jun. 17, 1987 [JP] Japan .............................. 62-93202[U]

[51] Int. Cl.$^5$ ............................................. G03G 21/00
[52] U.S. Cl. ................................................... 355/320
[58] Field of Search ............... 355/309, 313, 314, 318, 355/320, 75

[56] References Cited

U.S. PATENT DOCUMENTS

| | | | |
|---|---|---|---|
| 4,140,387 | 2/1979 | Gustafson | 355/320 X |
| 4,332,462 | 6/1982 | Yagasaki et al. | 355/309 |
| 4,335,954 | 6/1982 | Phelps | 355/318 X |
| 4,412,740 | 11/1983 | Buddendeck et al. | 355/320 X |
| 4,723,148 | 2/1988 | Hamakawa | 355/320 X |

FOREIGN PATENT DOCUMENTS

| | | | |
|---|---|---|---|
| 58-179873 | 10/1983 | Japan | 355/309 |
| 61-193139 | 8/1986 | Japan | 355/318 |
| 61-277972 | 12/1986 | Japan | 355/318 |

Primary Examiner—Fred L. Braun

[57] ABSTRACT

An automatic original document feeder is provided which feeds an original document placed on an original document table so as to invert the original document thus fed through an inverting transport section for its transport to an image exposing position with an image surface of the original document being inverted. A transport belt is provided for feeding the original document into the inverting transport section, and an original document stopper is provided for stopping the original document transported by the transport belt once at a position before it is fed into the inverting transport section in order to again transport, by the transport belt, the original document stopped by the original document stopper so as to be fed into the inverting transport section for transporting the inverted original document to the image exposing position.

2 Claims, 5 Drawing Sheets

AUTOMATIC ORIGINAL DOCUMENT FEEDER

BACKGROUND OF THE INVENTION

The present invention generally relates to a document feeding arrangement, and more particularly, to an automatic original document feeder for automatically feeding original documents to be copied, to an image exposing position successively.

Commonly, an electrophotographic copying machine is provided with a transparent original document platform for subjecting an image of an original document to be copied, to exposure and scanning, and so arranged that, by exposing for scanning, the original document placed at a predetermined or specified position on this original document platform through an optical means, the image of the original document is projected onto a photosensitive member serving as a recording medium, whereby an electrostatic latent image of an original document is formed on the photosensitive member.

Therefore, in the case where many original documents must be dealt with for copying, there has been required an extremely troublesome manual procedure for placing the original document to be copied on the original document platform one sheet by one sheet, thus increasing the time required for performing the work. Accordingly, in order, to eliminate this troublesome manual operation and for simplification of the copying operation, an arrangement referred to as an automatic original document feeder has been developed so as to automatically transport the original document to an exposing position.

The automatic original document feeder as referred to above is, for example, so arranged as to feed original documents stacked at a predetermined position, one sheet at a time, for automatic transport thereof into the exposing position, and also to transport the original document onto a discharge tray different in position from the stacked position after completion of the exposure. Here, in the case where the original document is of a duplex or both sided original document, it is necessary to feed the original document to the exposing position at both faces for the duplex copying or one side face copying thereof. For this purpose, the automatic original document feeder is provided with an inverting transport section for turning over or inversion between the front face and reverse face of the original document.

As described above, through turning over between the front and reverse surfaces of the original document via the inverting transport section during transport of the duplex original document to the exposing position, opposite surfaces of the original document may be fed into the exposure position for exposure and scanning on both surfaces.

However, in the conventional arrangement, control is provided such that the transported original document is fed to the inverting transport section as it is so as to be transported to the exposing and scanning position through the inverting transport section, and thus, the transport passage for the original document becomes very long, resulting in a slantwise or diagonal feeding of the original document in some cases. If the original document is transported to the inverting transport section as it is fed slantwise as described above, damages to the original document or jamming thereof may take place.

SUMMARY OF THE INVENTION

Accordingly, an essential object of the present invention is to provide an automatic original document feeder, which is provided with an inverting transport section for turning over the original document, and capable of preventing slantwise feeding of the original document during feeding thereof into an exposing position.

Another object of the present invention is to provide an automatic original document feeder of the above described type, which is capable of transporting the surface to be copied of the original document subjected to jamming, to the exposing position, by merely placing the duplex original document on an original document table under a predetermined state at all times.

A further object of the present invention is to provide an automatic original document feeder, which is provided with an inverting transport section for turning over the original document, and capable of preventing jamming of the original document in the transport in a direction opposite to that for the exposing position during feeding thereof into the exposing position.

In accomplishing these and other objects, according to one aspect of the present invention, there is provided an automatic original document feeder arranged to feed an original document placed on an original document table so as to invert the original document thus fed through an inverting transport section for transport thereof to an image exposing position, with an image surface of the original document being inverted, and characterized in that there are further provided a transport means for feeding the original document into said inverting transport section, and an original document stopper provided for stopping the original document transported by said transport means once at a position before it is fed into said inverting transport section, thereby again transporting, by the transport means, the original document stopped by the original document stopper so as to be fed into the inverting transport section for transporting the inverted original document to the image exposing position.

By the automatic original document feeder of the present invention having the construction as described above, the original document to be transported is stopped once before the inverting transport section. At this time, the original document is to be aligned, for example, with its leading edge contacting the original document stopper. Thus, the original document stopped and aligned at its leading edge is re-transported so as to be fed to the exposing position through the inverting transport section. As described above, since the original document is transported to the inverting transport section in the state once prevented from advance, it is advantageously fed to the exposing position as it is corrected from the state of slantwise feeding.

In another aspect of the present invention, there is also provided an automatic original document feeder arranged to feed a duplex original document placed on an original document table so as to invert the duplex original document thus fed through an inverting transport section for transporting both surfaces of the original document to an image exposing position, with image surfaces of the original document being inverted, and characterized in that there are further provided a memory section for memorizing a state of exposure scanning on the front or reverse surface of the original document to be transported to the image exposing position, means for suspending transport control of the original document through transport jamming detection thereof, means for starting transport of the jammed original document placed on the original document table based on releasing of the jamming, and a control means which controls the re-transport of the jammed original document by the starting means for inverted or non-inverted transport based on the content stored in the memory section so as to feed the original document to the image exposing position.

In the above arrangement of the present invention, the original document transported to the exposing position is memorized each time as to whether it is in the state for effecting the exposure scanning on the front surface or reverse surface. Therefore, if the original document is subjected to jamming, the state of exposure on the front surface or reverse surface of the original document at the jamming is stored for memorizing. Thus, by merely placing the jammed original document in a manner similar to the ordinary placing procedure upon releasing from the jamming, the original document is again transported, and furthermore, controlled for transport according to the above content of memory, and in the case of jamming at the exposing scanning for the reverse surface of the original document, the document is transported to the exposing position after inverted transport, while the document is in the state for processing at the front surface thereof, it is transported to the exposing position without being inverted for transport.

In a further aspect of the present invention, there is provided an automatic original document feeder arranged to feed an original document placed on an original document table so as to invert the original document thus fed through an inverting transport section for transport thereof to an image exposing position, with an image surface of the original document being inverted, and characterized in that there are further provided a transport means for transporting the supplied original document to the exposing position and also for feeding the original document into the inverting transport section, an original document stopper movably provided for stopping the original document transported by the transport means at a predetermined position of the image exposing position, a driving means for moving the original document stopper, and a control, means which actuates said driving means for moving the original document stopper to a position to restrict the leading edge of the original document during transport of the inverted original document through the inverting transport section.

By the above arrangement according to the present invention, since the original document to be fed is located at a position to be restricted by the original document stopper, the leading edge of the original document is restricted and stopped at that position, and in the case where the original document is to be inverted, the original document is transported in the opposite direction towards the original document platform through the inverting transport section. In this case, although the original document is to pass the stopper in the direction opposite to that when it is fed to the inverting transport section, the stopper is actuated to the position for restricting the original document, and therefore, the leading edge of the original document is guided over the stopper so as to be led to the original document platform. In other words, due to the fact that the upper surface of the stopper becomes higher than the original document placing surface of the original document platform the leading edge of the original document is guided over the stopper

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
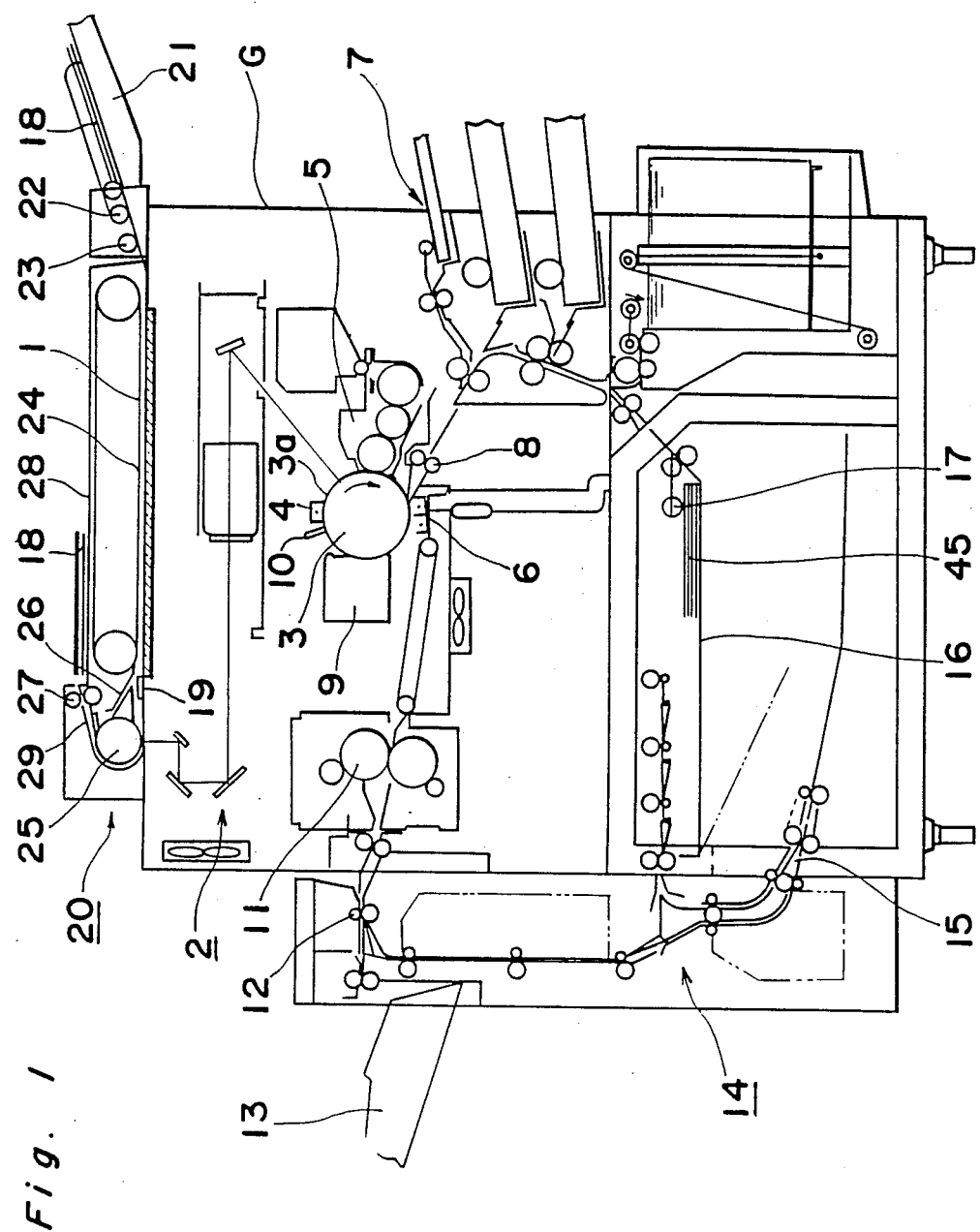
FIG. 1 is a schematic side sectional view of an electrophotographic copying machine to which an automatic original document feeder according to one preferred embodiment of the present invention is applied.

Before the description of the present invention proceeds, it is to be noted that like parts are designated by like reference numerals throughout the accompanying drawings.

Referring now to the drawings, there is shown in FIG. 1, an electrophotographic copying machine to which an automatic original document feeder according to one preferred embodiment of the present invention may be applied.

In FIG. 1, the copying machine includes an original document platform 1 provided at the upper portion of a housing G of the copying machine for optical exposure and scanning of the original document placed thereon by means of an optical system 2 disposed below and adjacent to the platform 1. A photoreceptor drum 3 provided having a photoconductive or photosensitive surface 3a around its peripheral surface and rotatably disposed within the housing G under the optical system 2. Various processing devices are provided such as a corona charger 4 for uniformly charging the photosensitive surface 3a to which a light image of the original document is projected through the optical system 2 to form an electrostatic latent image of the original document thereon. A developing device 5 is provided for developing the electrostatic latent image formed on the photosensitive surface 3a into a visible toner image. A pair of rollers 8 are provided for directing copy paper sheets selectively fed from a paper feeding section 7 toward the photoreceptor drum 3, a transfer charger 6 transfers the visible toner image on the photosensitive surface 3a onto the copy paper sheet fed through the rollers 8, a cleaning device 9 removes developing material remaining on the surface 3a after the transfer, and a charge erasing means 10 uniformly erases potential on the photosensitive surface 3a, all of which are sequentially disposed around the photoreceptor drum 3 for the copy processing.

After the transfer, the copy paper sheet is separated from the photoreceptor drum 3 so as to be fed to a fixing section 11, where the transferred image is fixed onto the copy paper sheet.

In the case of one side face copying, the copy paper sheet which has passed through the fixing section 11 is discharged onto a discharge tray 13 via a change-over gate 12. On the other hand, in the case of the duplex or both side face copying, the copy paper sheet is guided into a duplex transport mechanism 14 by the action of said change-over gate 12, and directed onto an intermediate tray 16 through an inverting mechanism 15. On the intermediate tray 16, copy paper sheets already copied each for one side face are accommodated, with the image formed faces thereof directed upwards, and are arranged to be fed to the rollers 8 for the copying on the other side faces by a paper feeding roller 17 disposed to confront the intermediate tray 16.

In the copying machine arranged as described above, the automatic original document feeder 20 directly related to the present invention is provided to correspond to the original document platform 1.

The automatic original document feeder 20 referred to above generally includes an original document table 21 for stacking the original documents 18 thereon, with the image surfaces thereof directed downwards, a sheet feeding roller 22 for successively feeding the original documents, one sheet at a time, from the top layer of the stack, a register roller 23 for registering the original documents thus fed, an endless transport belt 24 movably supported by a pair of rollers for transporting the original document fed through the register roller 23 towards the original document platform 1, an inverting transport section 25 for inverting and transporting the original document fed through the transport belt 24, and a change-over gate 29 for changing over the direction of the original document fed through the inverting transport section 25 towards a transport passage 26 leading to the original document platform 1 again, or towards an original document discharge tray 28 through a discharge roller 27.

Here, on the original document platform 1, an original document stopper 19 is provided at a position serving as a reference position for the leading edge of the original document. Thus, the original document is to be placed on the platform, with the leading edge of the original document being aligned with the original document stopper 19. Based on the above placing of the original document, the optical system 2 starts exposure and scanning of the original document by a copying start instruction (a signal based on operation of a print switch or the like or on an automatic placing of the original document by the automatic original document feeder), and the image of the original document is projected onto the photosensitive surface 3a of the photoreceptor drum 3 through the optical system 2. The original document stopper 19 is movable and arranged to be retracted from the surface of the original document platform 1 by a driving mechanism such as a solenoid or the like (not shown). Therefore, upon retraction of the stopper 19, the original document is fed into the inverting transport section 25 by the transporting force of the transport belt 24 without any restriction.

Figure 2:
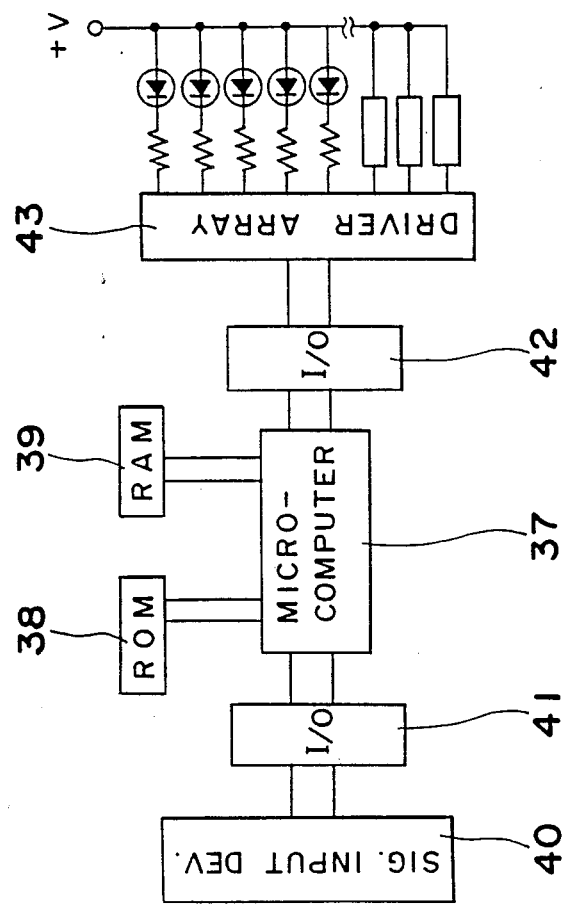
FIG. 2 is an electrical block diagram showing general construction of a control system for the automatic original document feeder employed in the arrangement of FIG. 1.

Reference is also made to FIG. 2 showing construction of a control system for the arrangement as described so far, which generally includes a microcomputer 37 having a ROM (read only memory) 38 and a RAM (random access memory) 39, and coupled, through interface circuits 41 and 42, with a signal input device 40 and a driver array 43 as shown.

The microcomputer 37 effects control according to a control program preliminary stored in the ROM 38, and the RAM 39 is used as a calculating region for buffer memory, and flags or the like required for copying control. Particularly, according to the present invention, the RAM 39 memorizes whether or not the exposure and scanning mode relates to the front surface or reverse surface of the duplex original document. The signal input device 40 for detection signals, by a key switch, copy paper switch or the like is to transfer the signal to the microcomputer 37 through the interface circuit 41. More specifically, in the copying machine main body, the detection signal for the transport position of the copy paper sheet, and signal for detecting the position of the photoreceptor drum, are applied to the microcomputer 37 through the interface circuit 41, while in the automatic original document feeder 20, the detection signal of the transported position of the original document is transferred to the microcomputer 37.

Meanwhile, the control signal from the microcomputer 37 is transferred, through the interface circuit 42, to the driver array 43 for controlling respective loads such as the display for copying magnifications, other display circuits, and loads of the automatic original document feeder 20 (e.g. at the driving section for the transport belt 24 and inverting transport section 25), and also respective loads for the copying machine main body. Accordingly, the feeder 20 and the copying machine main body are driven and controlled in association with each other by the microcomputer 37.

It is to be noted here that, in the foregoing embodiment, although the microcomputer 37 is arranged to drive and control not only the copying machine main body, but also the automatic original document feeder, the arrangement may be, for example, so modified that, by providing another driving and control system similar to the microcomputer 37 in the feeder 20 itself, signal transmission and reception are effected with respect to the microcomputer at the side of the copying machine main body for effecting a separate control.

Subsequently, the control functions for the arrangement of FIG. 1, particularly for the automatic original document feeder 20 according to the present invention will be described in detail hereinafter.

First, transport control for the one side face original document is to be described.

On the table 21 for the automatic original document feeder 20, one side face original documents 18 are stacked, with the image surfaces thereof directed downwards. The original document 18 thus placed is preliminary fed, one sheet at a time, by the paper feeding roller 22, and is further transported onto the surface of the original document platform 1 through the register roller 23. In this case, the transport belt 24 is driven so as to transport the original document 18 in the direction of the original document stopper 19 (i.e., forward direction driving). After the leading edge of the original document 18 transported by the belt 24 contacts the stopper 19, driving of the transport belt 24 is suspended through a slight delay for allowing the leading edge of the original document 18 to completely contact the stopper 19 so as to align the whole leading edge thereof with said stopper 19.

Accordingly, the original document 18 is stopped in the state where the leading edge thereof is aligned with the original document stopper 19. Upon stopping of the original document 18, the exposure and scanning of the original document by the optical system 2 is started, and the image of the original document 18 is projected onto the photosensitive surface 3a of the photoreceptor drum 3. In such a manner, the copying is effected, and the copy paper sheet formed with the image at its one side face is discharged onto the discharge tray 13 through the discharge roller.

Thereafter, upon completion of the exposure and scanning corresponding to the number of copies to be taken for the original document 18 placed at the specified position on the original document platform 1, the original document 18 is fed into the inverting transport section 25 by the driving of the transport belt 24 in the forward direction. At this time, the original document stopper 19 has been retracted, and the leading edge of the original document is released from the restriction by the stopper 19. The original document 18 transported through the inverting transport section 25 is guided towards the discharge roller 27 at the change-over gate 29, and is discharged onto the discharge tray 28, with the image surface thereof directed upwards. Such function is repeated until the original documents 18 stacked on the table 21 are all used up. Since the original documents 18 in the table 21 are successively fed from the sheet on the uppermost layer of the stack, the order of pages for the original documents 18 to be discharged onto the discharge tray 28 is in agreement with that of the original documents placed on the table 21.

In the above case, if the original document 18 is a one side face original document, it is not transported during placing on the platform 1 via the inverting transport section 25 as described above. Therefore, even if the original document is subjected to jamming during transport, it is only necessary to place this jammed original document on the original document table 21, with its image surface directed downwards. In this case, since the original documents 18 are to be fed from the uppermost sheet, the jammed original document has only to be placed at the upper portion of other original documents stacked on the table 21, and the procedure required therefor is very simple.

Figure 3:
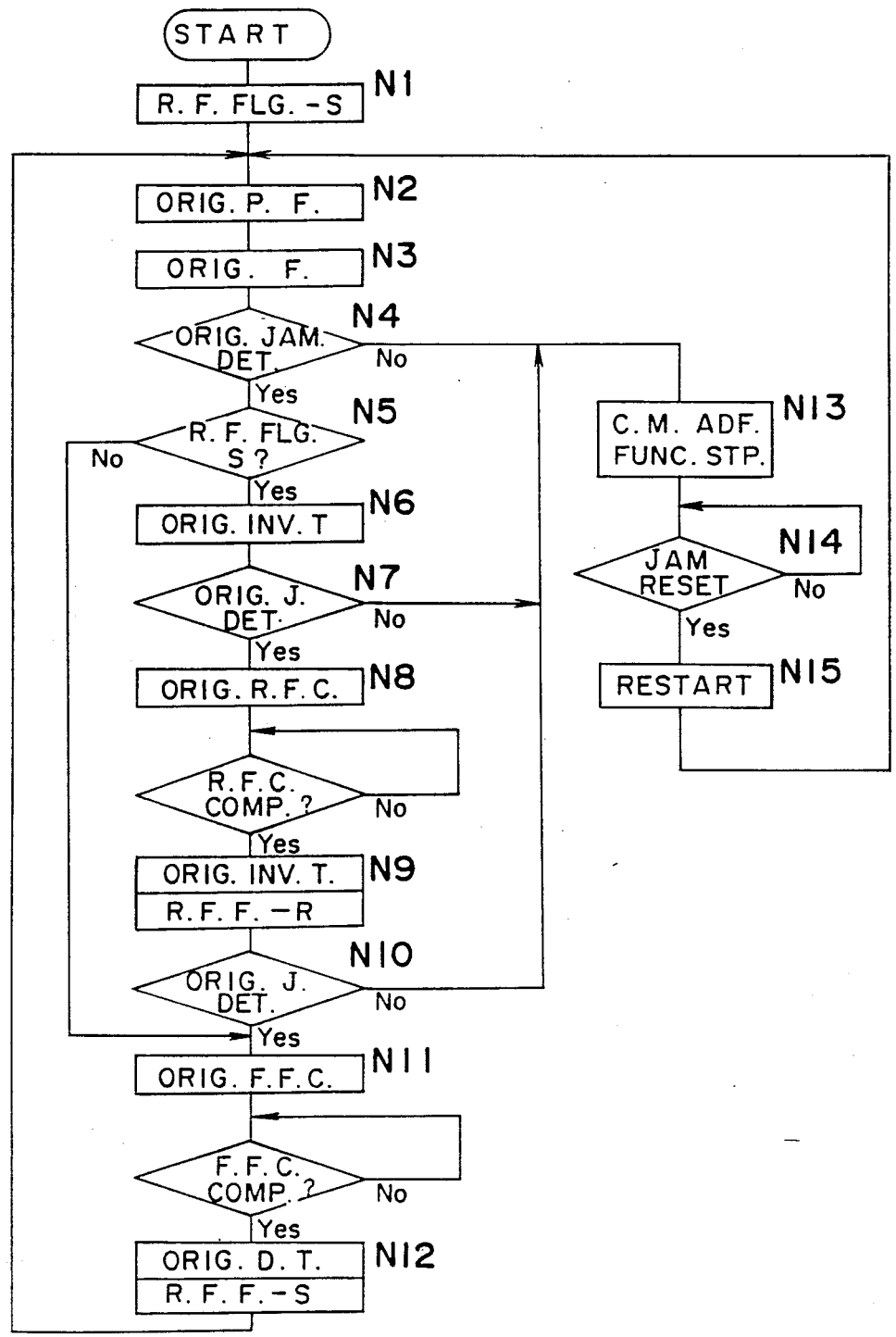
FIG. 3 is a flow-chart for explaining control procedures for the transport of original documents according to the present invention.

Subsequently, the control function of the automatic original document feeder 20 for the duplex original documents according to the present invention will be explained with reference to a flow-chart of FIG. 3.

First, the duplex or both sided original documents 18 are each placed on the original document table 21, with the front surfaces (odd numbered pages) thereof directed downwards, whereby operation input (not shown) indicating that the original documents are both sided is effected.

Thus, in order to first copy the reverse surfaces of the duplex original documents 18 stacked on the table 21 (i.e., even numbered pages, especially the upper surfaces with respect to the table 21), a reverse face flag is set (step N1). The original documents 18 are successively fed one sheet at a time, from the uppermost sheet of the stack (i.e., the last sheet of the original documents) by the action of the paper feeding roller 22 so as to be preliminary fed up to the register roller 23 (step N2), and are transported over the original document platform 1 by the driving of the transport belt 24 in the forward direction through the register roller 23 (step N3). In this case, the duplex original document 18 is transported, with the front face thereof moving along the platform 1. Therefore, in order to first copy the reverse face (even numbered page) of the original document, this original document 18 is to be fed into the inverting transport section 25 (step N6). At this time, the original document 18 thus transported is stopped once before being fed into the inverting transport section 25 at a position of the original document stopper 19. Accordingly, during inverted transportation of the duplex original document 18 towards the platform 1, the original document stopper 19 is not brought into the retracted state, but is driven into the non-retracted state for stopping the original document once so as to transport the reverse face of the original document towards the original document platform 1.

Therefore, the original document 18 is stopped under the state where its leading edge is registered with the original document stopper 19 wherein its slantwise feeding is corrected.

After a predetermined period of time from the point when the original document is stopped once by the stopper 19 as described above, the transport belt 24 is again driven in the forward direction for transporting the stopped original document 18. In the course of such transportation, jam detection of the original document 18 is effected (step N4), and if the original document which is being transported is not subjected to jamming, it is checked whether or not the reverse face flag is set (step N5). In this case, since the transportation is intended to copy the reverse face of the original document, the inverting transport driving of the original document is effected (step N6). Meanwhile, if the jamming of the original document has taken place, the procedure is shifted from step N4 to a step for jam treatment (to be described in detail later).

When transported into the inverting transport section 25 by the transport belt 24, the original document 18 is inverted and guided into the transport passage 26 through the change-over gate 29, and is again transported towards the original document platform 1. When the leading edge of this original document 18 is detected by an original document detector (not shown here) disposed in the course of the transport passage 26, the transport belt 24 is driven in the opposite direction (reverse direction driving). In this case, if the original document is long, there may be a case where the transport belt 24 is driven in the reverse direction while the trailing edge of the original document is still located at the position of the transport belt 24, but by making the transport force of the inverting transport section 25 stronger than that of the transport belt 24, the original document may be transported int he transport direction of the inverting transport section 25, and thus the inverting transport is continued without any problem.

When the original document 18 is again transported to the platform 1 through the inverting transport section 25, the image surface of the original document 18 has been turned over so that the reverse surface thereof confronts the platform 1. A timer is driven from a point in time when the trailing edge of the original document has been detected by the detector of the transport passage 26 during the above transportation, and the driving of the belt 24 is suspended at a point in time when the trailing edge of the original document passes through the stopper 19, and the transport belt 24 is again driven in the forward direction. The timer referred to above is set for a time period when the trailing edge of the original document passes through the stopper 19, and the driving control of the belt 24 in the forward direction is effected after the lapse of the time period set by the timer.

When the transport belt 24 is driven in the forward direction, the original document 18 is transported towards the stopper 19, with the trailing edge thereof taking the lead, and at this time, the stopper 19 has been shifted to the position for restricting the transport of the original document 18. Accordingly, the original document 18 is stopped, with its leading edge (or its trailing edge before the inversion) contacting the stopper 19. After a predetermined period of time subsequent to contact of the leading edge of the original document with the stopper 19, driving of the transport belt 24 is suspended.

In the manner as described above, the reverse surface of the duplex original document 18 is to be placed at the specified position on the original document platform 1. Corresponding to the above function, the exposure and scanning by the optical system 2 of the copying machine is started (step N8). In the course when the duplex original document 18 is inverted and transported to the platform also, detection of jamming of the original document (step N7) is effected, and if there is no jamming of the original document, copy paper sheets of a desired size are selected to be fed from the paper feeding section 7. Thus, the copy paper sheets 45, each formed with the copied image on its one side face, are fed onto the intermediate tray 16 through the duplex copying transport mechanism 14, and successively stacked on the tray 16 according to the number of copies to be made.

Upon completion of exposure corresponding in number to the number of copies to be made for the reverse surface of the duplex original document 18, the automatic original document feeder 20 starts a function for copying the front surface of the original document 18. The original document on the platform 1 is transported by the transport belt 24 which is driven so as to be fed into the inverting transport section 25 (step N9). In this case, the original document stopper 19 has been retracted. Simultaneously, a reverse face flag is reset (R) for copying the front surface of the duplex original document. The original document fed into the inverting transport section 25 is transported and controlled in a manner similar to the previous function, with its front surface confronting the platform 1 this time, and is placed at the specified position with the leading edge thereof restricted by the stopper 19. After the original document has been placed as described above, the exposure and scanning of the image thereof is effected (step N11), and the image corresponding to that on the front surface of the original document is formed on the opposite surface of the copy paper sheet 45 previously copied with the image on the reverse surface of the original document. In this case, one copy paper sheet 45 is successively fed with respect to one exposure from the intermediate tray 16. In such a manner, the copy paper sheet 45 formed with the copied images on both surfaces thereof is discharged onto the discharge tray 13 through the discharge roller.

On the other hand, the original document 18 completed for exposure of the image on its front surface is inverted for transport by the inverting transport section 25 so as to be discharged onto the discharge tray 28 through the change-over gate 29 (step N12), while a reverse face flag is set for copying the image on the reverse surface of the next original document on the original document table 21. The discharged original documents 18 are stacked on the discharge tray 28, with the front surfaces thereof directed upwards. The transport control of the duplex original documents 18 as described above is repeated until the original documents on the table 21 are all used up, and the original documents completed for the exposure on both surfaces are discharged onto the discharge tray 28 so as to be piled upon the original documents previously discharged.

Accordingly, the discharged original documents 18 are to be stacked on the discharge tray 128 in the same order for pages as that of the duplex original documents placed on the original document table 21.

As described so far, if the duplex original document 18 is subjected to jamming during transport, the jam detection is made (steps (N4, N7, N10), whereby control for the jam treatment is effected. More specifically, functionings of the copying machine main body and the automatic original document feeder 20 are stopped (step N13) for notification of the original document jamming. In response to this notification, the original document subjected to jamming is removed, and is placed on the original documents stacked on the original document table 21. In this case, the jammed original document may be placed, with its reverse surface directed downwards in a manner similar to the initial copying. In short, the original document may be placed on the table 21, with the image surface thereof held in the same state at all times, regardless of whether it is being transported for copying of its front surface or reverse surface, and thus, the procedure after the jam treatment is extremely simplified.

Upon placing of the jammed original document as described above, jam resetting (step N14) is effected for operation to start the copying (step N15). In other words, the copying function may be resumed when the copying switch is actuated again. In this case, the procedure reverts to step N2, and the jammed original document placed on the uppermost portion of the stack is supplied, and the original document 18 is fed onto the transport belt 24 through the register roller 23. Thus, at step N5, it is checked whether or not the reverse face flag is set. Here, if the reverse face flag has been set, it is judged that the original document to be re-transported in one which is subjected to jamming during transportation for effecting copying on the reverse surface, and is fed to the inverting transport section 25 through the transport belt 24 without being placed on the table 21, and thus placed on the platform 1 with the reverse face thereof directed downwards by the inverting transport section 25.

On the other hand, if the original document to be re-transported is one which is subjected to jamming during transportation for copying of the front surface, the reverse face flag has been reset, and the procedure proceeds from step N5 to step N11. In other words, the supplied original document 18 is transported by the transport belt 24 and stopped as it is at the position of the stopper 19 without being inverted so as to be placed thereat. By the above completion of the placing, the processing for step N11 is executed, and upon completion of copying, the procedure advances to step N12 for discharging the original document 18 and setting the reverse face flag.

As described above, even if jamming takes place in the course of transportation for the copying of its reverse surface or front surface, the duplex original document may be placed on the original document table 21 in the same state at all times for the re-transportation of the jammed original document thus treated for jamming. Accordingly, the state of jamming of the original document is memorized by the reverse face flag, and based on the memorized content, the inverted or non-inverted transport is executed, and thus, the predetermined image surface in the original document transportation before the jamming may be placed on the original document platform 1. It is to be noted here that part of the RAM 39 in FIG. 2 is allocated, for the reverse face flag and the state of jamming is to be stored in this portion.

According to the automatic original document feeder 20 of the present invention having the construction and function as described so far, even when the reverse surface original document is subjected to jamming in the course of its transportation, this jammed original document may be placed on the original document table in the same state as in the first state of placing, without any particular consideration or precautions, with a consequent simplification of the procedure required therefor to a large extent. In other words, it is only required to place the original documents int he same state at all times, regardless of whether the reverse surface or the front surface of the duplex original document is being transported, and thus, not only is the troublesome procedure therefore eliminated, but erroneous placing of the original document can also be prevented.

Figure 4:
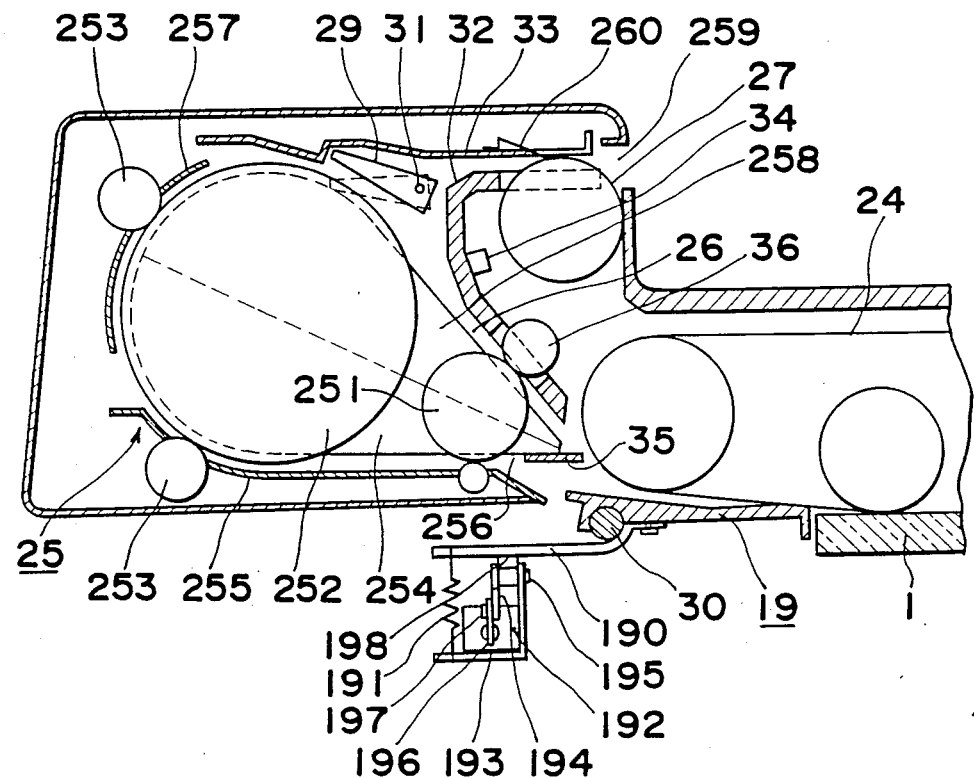
FIG. 4 a fragmentary side sectional view showing an essential portion of an inverting transport section for the automatic original document feeder according to a second embodiment of the present invention.
Figure 5:
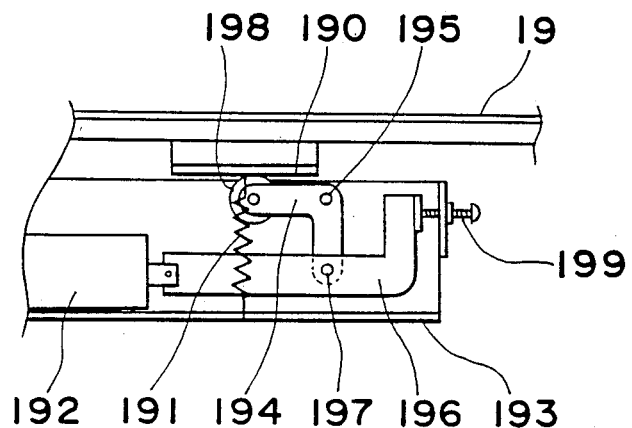
FIG. 5 is a fragmentary top plan view showing one specific example of a driving mechanism for the original document stopper employed for the arrangement of FIG. 4.

Reference is made to FIGS. 4 and 5 showing an essential portion of the inverting transport section for the automatic original document feeder according to a second embodiment of the present invention.

It should be noted here that, since the construction of the copying machine provided with the automatic original document feeder of the present invention and the driving mechanism for the original document stopper to be provided int eh feeder are generally similar to those described earlier in the first embodiment with reference to FIGS. 1 and 2, detailed description thereof is abbreviated here for brevity.

Subsequently, the construction of the inverting transport section for feeding the original document to the exposure position on the original document platform 1 after turning over of the original document will be described hereinbelow with particular reference to FIG. 4.

As shown in FIG. 4, the original document stopper 19 is rotatably provided for rotation about a shaft 30 in a position below and adjacent to the transport belt 24. A functioning plate 190 is connected to the stopper 19 to which an urging means 191, for example, of a spring or the like is connected so as to urge the stopper 19 counterclockwise. A driving means 192 such as a solenoid is fixed to a fixing plate 193 secured to the copying machine main body for rotating the stopper 19 in the clockwise direction. More specifically, the opposite ends of the spring 191 are fixed to the fixing plate 193 and the functioning plate 190 clockwise direction.

As shown in FIG. 5, an L-shaped angle member 194 is rotatably supported on the fixing plate 193 by a shaft 195 for rotation therearound, with one end of the angle member 194 being pivotally connected to a connecting plate 196 through a shaft 197. One end of the connecting plate 196 is connected to a functioning portion of the driving means 192 so as to be pulled to the left in FIG. 4 upon energization of the driving means 192. Moreover, one the other end of the L-shaped angle member 194, a roller 198 is rotatably mounted for contact with a free side end of the functioning plate 190.

Accordingly, the original document stopper 19 is normally maintained at the position shown in FIG. 4 by the urging force of the spring 191. For restricting the urging force of the spring 191, one end of an adjusting screw 199 threaded into a partially folded portion of the fixing plate 193 contacts a corresponding folded portion of the connecting plate 196, whereby the stopper 19 is restricted at the position shown in FIG. 4. The above position may be readily adjusted by rotating the adjusting screw 199 in either direction.

When the driving means 192 of a solenoid or the like is energized, the L-shaped angle member 194 is rotated against the urging force of the spring 191 so as to push up the functioning plate 190. In this case, the stopper 19 is rotated clockwise and the surface of the stopper 19 is adapted to be retracted below the surface of the platform 1. Accordingly, upon energization, the driving means 192 retracts the stopper 19 below than the surface of the original document platform 1, whereby the original document 18 is released from the restriction at its leading edge, and is allowed to be transported towards the inverting transport section 25 through the driving in the forward direction of the transport belt 24.

The inverting transport section 25 for effecting the inverted transportation of the original document includes a transport roller 251 for further transporting the original document transported by the belt 24, an inverting roller 252 for inverting and feeding the original document transported through said roller 251, and a driven roller 253 held in pressure contact with the inverting roller 252. There are also provided a guide plate 254 for guiding the original document transported by the belt 24 towards the roller 251, a lower guide plate 255 provided with respect to the guide plate 254 to define an inverting carry-in passage 256 therebetween and another arcuate guide plate 257 disposed to confront the inverting roller 252 so as to guide the original document transported through inversion along the roller 252.

The change-over gate 29 pivotally provided about a shaft 31 is arranged to change over the transport direction of the inverted original document towards the transport passage 26 or discharge roller 27 as referred to earlier. If the change-over gate 29 is at the solid line position in FIG. 4, the original document is guided to the transport passage 26 and is led onto the original document platform 1 confronting the transport belt 24. The transport passage 26 is defined by a guide plate 258 disposed above the guide plate 254 and a guide wall 32. Meanwhile, when the change-over gate 29 is rotated in the counterclockwise direction (dotted line position), the original document is guided towards the discharge roller 27. This passage leading to the discharge roller 27 is defined between the guide wall 32 and an upper guide plate 33. At the sheet discharge side of the discharge roller 27, a discharge port 259 leading to the discharge tray 28 is formed. A presser member 260 is held in pressure contact with the discharge roller 27 so as to hold the original document therebetween for discharge thereof onto the discharge tray 28.

On the other hand, in the transport passage 26, there is disposed an original document detector 34 constituted by a microswitch, photoelectric switch or the like for detecting the original document transported through the passage 26. The driving control of the transport belt 24 is effected based on the detection signal of the detector 34. The transport passage 26 serves as an inverting carry-out passage for again guiding the original document to the exposure position on the platform 1, and a guide member 35 is provided for positively guiding the inverted original document onto the original document platform 1. This guide member 35 is positioned at a branching point between the inverting transport passage 256 and the inverting carry-out passage 26, and has its one end fixed to the guide plate 254 and the other free end thereof extended to be close to the transport belt 24. For the guide member 35, a flexible film (e.g. polyethylene terephthalate or PET) of approximately 0.1 mm in thickness may be suitably employed. It is to be noted here that, if the guide member 35 is too thick, abnormal noises such as flipping noises may be produced due to contact thereof with the original document during guiding of the original document, while on the contrary, if the guide member is excessively thin, it may lose its original guiding function due to low resistance against toughness of the original document.

The transport roller 251 is so provided as to be positioned in the inverting carry-in passage 256, and also, in the carry-out passage 26. A driven roller 36 is held in pressure contact with respect to the roller 251 located in the carry-out passage 26.

Since other functions and constructions of the automatic original document feeder as described so far are generally similar to those described earlier with reference to the first embodiment, detailed description thereof is abbreviated here for brevity.

Referring also to a flow-chart of FIG. 6, a control function of the automatic original document feeder 20 according to the present invention will be explained hereinafter.

In the first place, the duplex original documents 18 are stacked on the original document table 21, with the image surfaces, i.e. the front surfaces (odd number pages) thereof directed downwards. The original documents 18 thus stacked are fed, one sheet at a time, from the uppermost sheet (i.e. the last numbered original document) by the action of the feeding roller 22, and through the register roller 23, transported over the original document platform 1 by the driving of the transport belt 24 in the forward direction, with the front surface thereof moving along the platform 1. Therefore, in order to copy the reverse surface (even numbered pages) of the original document first, the original document 18 is fed into the inverting transport section 25. At this time, the original document 18 being transported is stopped once at a position before it is fed into the inverting transport section 25 at the position of the stopper 19. Accordingly, during inverted transportation of the duplex original document 18 towards the platform 1, the original document stopper 19 is not brought into the retracted state, but is driven into the non-retracted state for stopping the original document once so as to transport the reverse face of the original document towards the original document platform 1. In other words, the driving means 192 is brought into a de-energized state, and the stopper 19 is maintained at the position for restricting the original document by the urging force of the spring 191.

Therefore, the original document 18 is stopped under the state where its leading edge is registered with the position of the original document stopper 19 under the state where its slantwise feeding is corrected.

Figure 6:
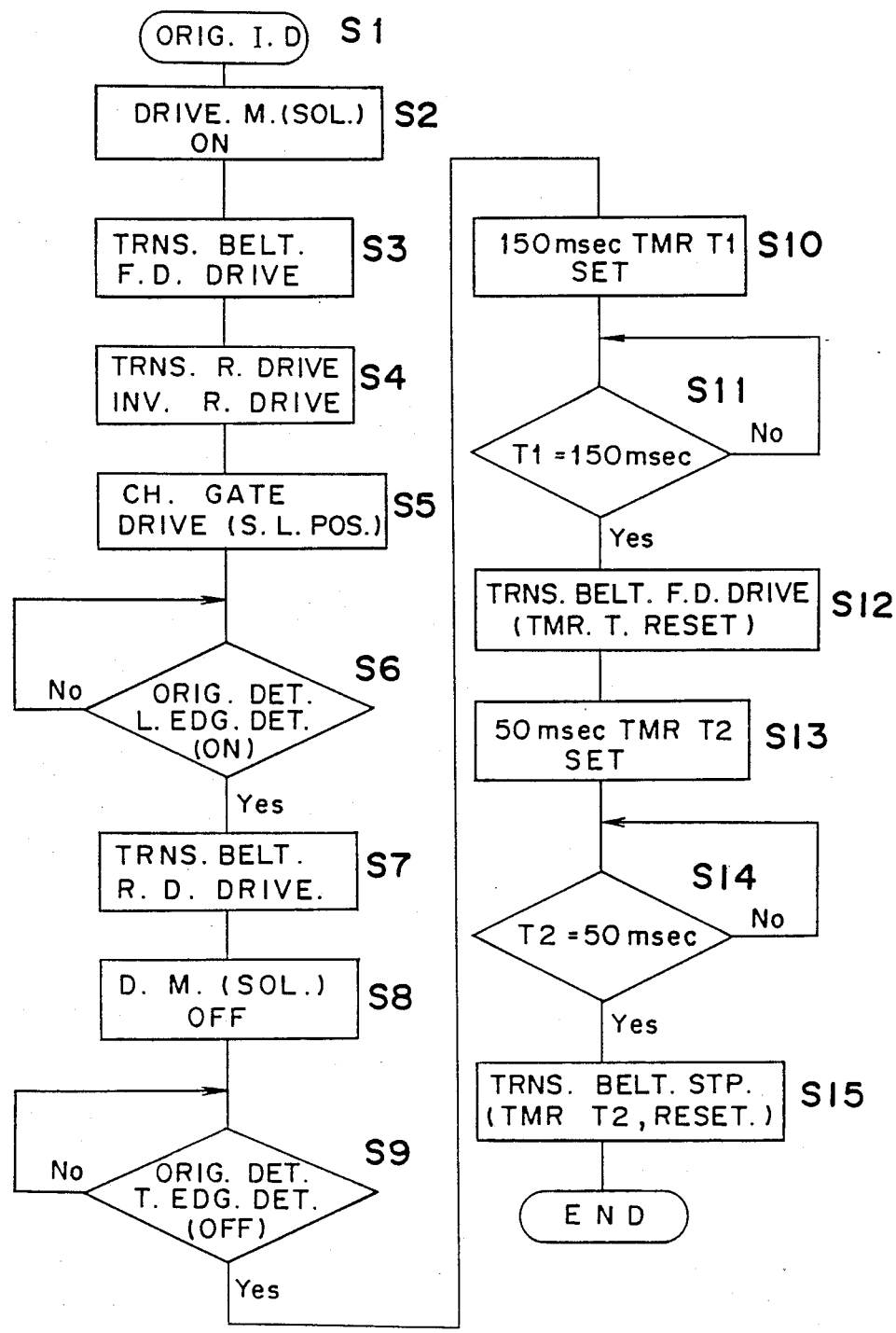
FIG. 6 is a flow-chart for explaining the original document transport control function according to the present invention.

After a predetermined period of time from the time when the original document is stopped once by the stopper 19 as described above, an original document inverting signal is outputted (step S1) as shown in the flow-chart of FIG. 6, and based on this signal output, the stopper 19 is retracted (step S2) from the restricting position to the non-restricting position. In other words, the driving means 192 is energized so as to turn the stopper 19 clockwise about the shaft 30, whereby the upper surface of the original document stopper 19 is made lower than the surface of the platform 1. Then, the transport belt 24 is driven in the forward direction (step S3), with simultaneous driving of the transport roller 251 and inverting roller 252 for the inverting transport section 25 (step S4), and the change-over gate 29 is also driven to be changed over to the position shown by the solid lines (step S5).

In the manner as described so far, the transport belt 24 is driven in the forward direction once more so as again transport the stopped original document. In this case, the stopper 19 is driven into the retracted state, thereby releasing the original document 18 from the restriction. The original document 18 is then inverted and transported by the inverting roller 252 through the transport roller 251 and is guided into the transport passage 26 via the change-over gate 29 for being transported again by the belt 24 towards the platform 1. Upon detection of the leading edge of the original document 18 by the original document detector 34 disposed int eh path of the transport passage 26 (step S6), the transport belt 24 is driven in a direction opposite to that up to that time (reverse direction driving step S7). Moreover, at this time point, the stopper 19 is positioned in the restricting position of the original document (step S8). In this case, the driving means 192 takes the de-energized state and the stopper 19 is located higher than the surface of the original document platform 1 by the spring 191. Accordingly, the original document 18 is guided over the stopper 19 towards the platform 1 in the direction opposite to that during the inverted transportation.

Although the original document 18 is transported to the platform 1 through the stopper 19, since the stopper 19 is located higher, the original document is normally transported without being caught at the reference edge of the platform 1. When the trailing edge of the original document 18 transported by the belt 24 is detected by the detector 34 (step S9), a 150 msec timer is set (step S10). This timer is set at time when the trailing edge of the original document passes through the stopper 19. In other words, the timer is set at a time period slightly longer than that from the detection of the original document trailing edge to the arrival of this trailing edge at the stopper 19. Such a time period may be determined by the distance from the detector 34 to the stopper 19, and the transport speed of the original document.

As described above, when the 150 msec timer counts the time (step S11), the transport belt 24 is driven in the forward direction (step S12). Thus, a 50 msec timer is set this time (step S13), and it is judged whether or not this timer has counted 50 msec (step S14). AFter the timer has counted 50 msec, the transport belt 24 is driven in the forward direction. Accordingly, the leading edge of the original document is restricted by the stopper 19 so as to be corrected in its slantwise state for alignment into a straight line, with the original document being thus positioned at the predetermined position of the platform 1.

It is to be noted here that the driving of the inverting transport section 25 is suspended during the forward direction driving of the transport belt at step S12.

In the manner described above, when the original document 18 is transported again to the platform 1 through the inverting transport section 25, it is fed in the state where the image surface thereof has been turned over, with the reverse surface thereof confronting the platform 1. By this procedure, placing the reverse surface of the duplex original document 18 onto the specified position on the platform 1 is completed. According to the above, the exposure scanning by the optical system 2 of the copying apparatus main body is started. Copy paper sheets of a desired size are selected and supplied from the feeding section 7, and the copy paper sheets 45 each having the copied image formed on its one surface are carried out onto the intermediate tray 16 through the duplex copying transport mechanism 14, and stacked on the tray 16 according to the number of copies taken.

Upon completion of the exposure int he number of time corresponding to the number of copies to be taken for both surfaces of the duplex original document, the automatic original document feeder 20 starts functioning to effect copying for the front surface of the original document 18. In other words, the transport belt 24 is driven in the forward direction so as to feed the original document into the inverting transport section 25. In this case, the original document stopper 19 has been retracted. The original document 18 fed into the inverting transport section 25 is controlled for transport similar to the previous function, and transported this time so that the front surface thereof confronts the platform 1, and is placed at the specified position, with its leading edge restricted by the stopper 19. After the above placing, the exposure scanning of the original document image is effected, and the image on the front surface of the original document is formed on the opposite surface of the copy paper sheet 45 on which the reverse surface has been copied previously. In this case, the copy paper sheets 45 are successively fed from the intermediate tray 16, one sheet at a time, with respect to the exposure of reach one time, and thus, the copy paper sheet 45 formed with the copied images on both surfaces is discharged into the discharge tray 13 through the discharge roller.

On the other hand, the original document 18 completed for the image exposure on the front surface is inverted and transported by the inverting transport section 25, and is discharged into the discharge tray 28 through the change-over gate 29, with the front surface thereof directed upwards. Such transport control of the duplex original document 18 is repeated until the original documents on the table 21 are all used up, and the original documents completed for the exposure on both surfaces are discharged onto the original documents previously discharged on the tray 28. Accordingly, the discharged original documents are to be stacked on the discharge tray 28 in the same page order as that for the duplex original documents placed on the table 21.

As is clear from the foregoing description, according to the automatic original document feeder of the present invention having the construction as explained so far, since the original document stopper provided at the reference position on the original document platform is actuated to the restricted position when the original document is transported to the inverting transport section through the transport means, and the original document thus inverted by the inverting transport section is to be transported towards the original document platform, there is no possibility that the leading edge of the original document is caught by the reference edge of the original document platform to give rise to jamming, even if the original document is transported to the platform from the opposite side of the stopper, and thus, a smooth transport of the original document may be advantageously achieved.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. An automatic original document feeder arranged to feed an original document placed on an original document table to an image exposing position in both upright and inverted positions through an inverting transport section, said document feeder comprising:

transport means for transporting the supplied original document to the exposing position and also for feeding the original document into said inverting transport section;

an original document stopper movably provided for stopping the original document transported by said transport means at a predetermined position relative to said image exposing position;

driving means for moving said original document stopper; and control means for actuating said driving means and moving said original document stopper to a position restricting the leading edge of the original document during transport of both the upright and inverted original document through said inverting transport section, wherein said control means actuates said driving means in response to a detection signal from an original document detector disposed in a passage through which the inverted original document is transported to the exposing position.

2. An automatic original document feeder according to claim 1, wherein said original document stopper aligns said original document thereagainst to prevent jamming through said inverting transport section.

* * * * *